July 31, 1945.  T. PETERSEN  2,380,911
FOLDING TRIPOD
Original Filed Nov. 13, 1940   3 Sheets-Sheet 1
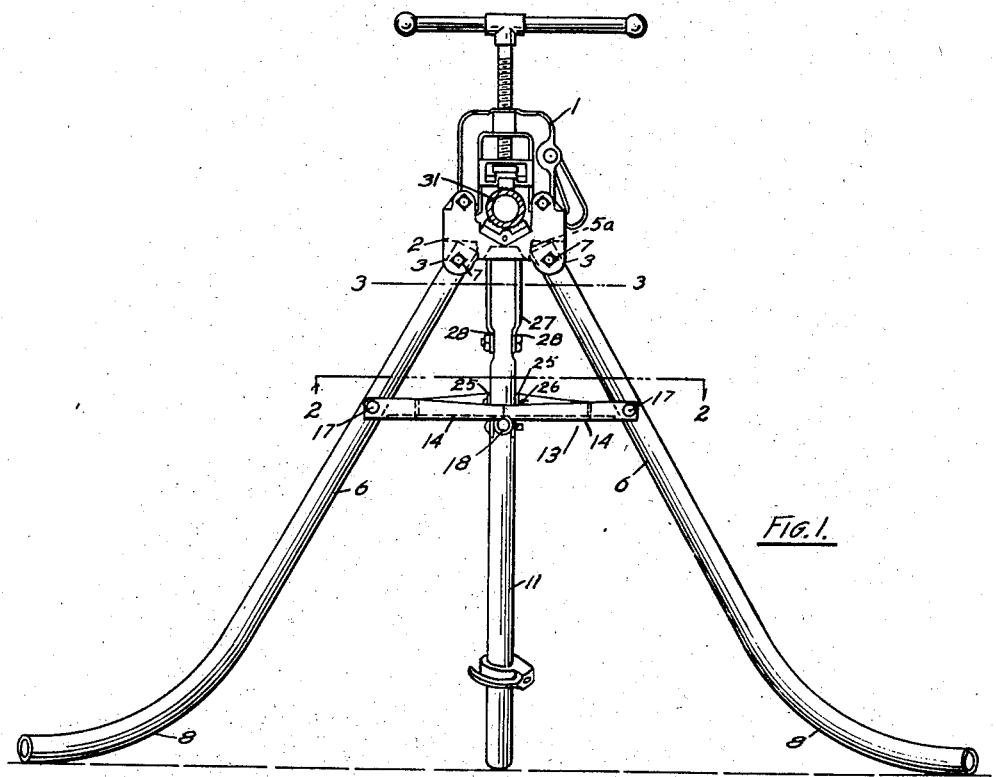
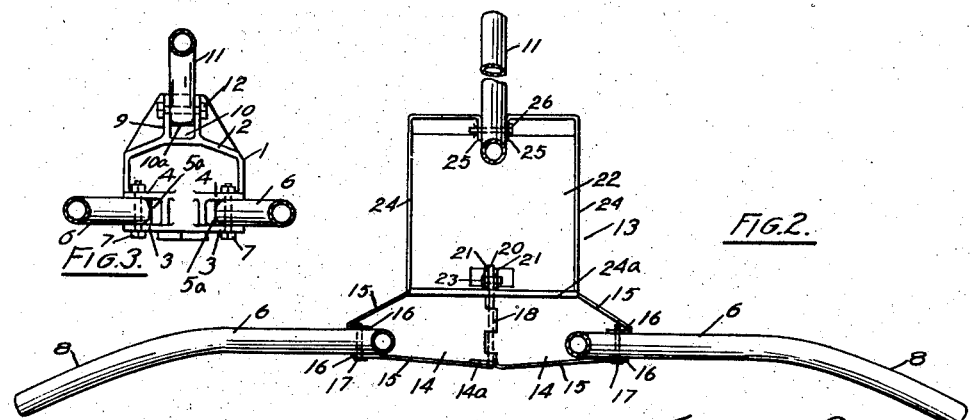
Thorwald Petersen
INVENTOR.
BY *N. L. Lind*
ATTORNEY.

July 31, 1945. T. PETERSEN 2,380,911
FOLDING TRIPOD
Original Filed Nov. 13, 1940 3 Sheets-Sheet 2
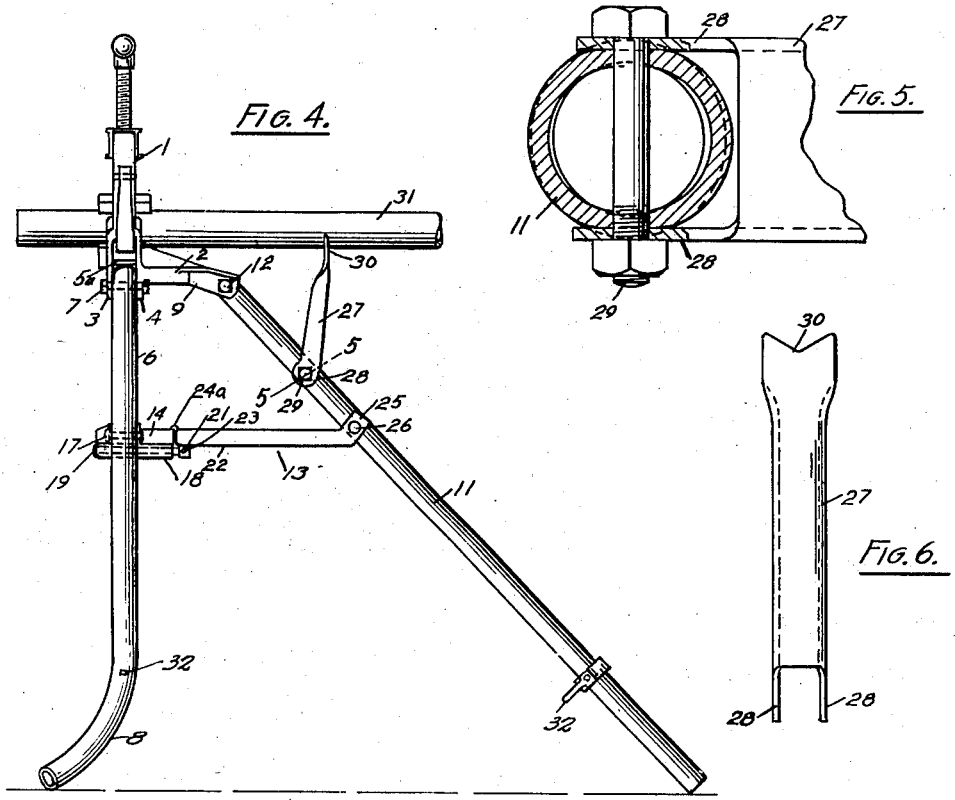
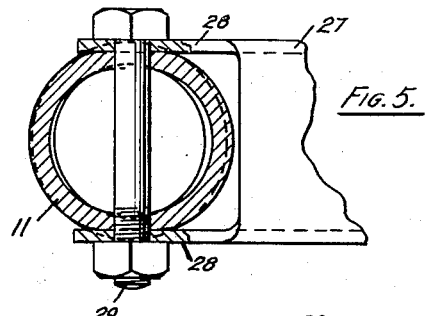
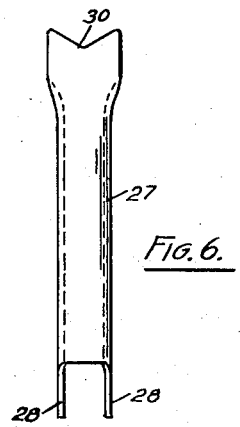
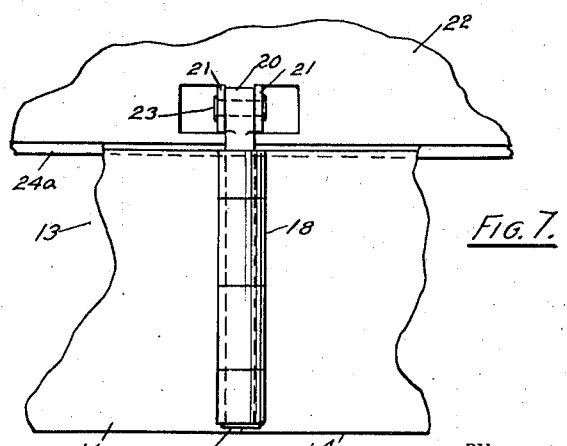
Thorwald Petersen
INVENTOR.
BY
ATTORNEY.

July 31, 1945.    T. PETERSEN    2,380,911
FOLDING TRIPOD
Original Filed Nov. 13, 1940    3 Sheets-Sheet 3

Thorvald Petersen
INVENTOR.

BY
ATTORNEY.

Patented July 31, 1945

2,380,911

UNITED STATES PATENT OFFICE 2,380,911

FOLDING TRIPOD

Thorvald Petersen, Erie, Pa., assignor to Reed Manufacturing Company, Erie, Pa., a corporation of Pennsylvania Original application November 13, 1940, Serial No. 365,475. Divided and this application September 22, 1943, Serial No. 503,313

4 Claims. (Cl. 248—169)

Various tools may be mounted conveniently on tripods. The present invention is designed to provide a tripod which may be folded, readily opened for use, and made rigid. As exemplified, the tripod is used for supporting a pipe vise for holding pipe as it is cut or threaded. In some respects the tripod is peculiarly advantageous with relation to this device because of the swinging clearances made possible for the cutting or threading tools. Features and details of the invention will appear from the specification and claims.

This application is a division of my application, Serial No. 365,475, filed November 13, 1940, now Patent No. 2,343,924.

A preferred embodiment of the invention is illustrated in the accompanying drawings as follows:

Fig. 1 shows a front elevation of the tripod in open or set position.

Fig. 2 a section on the line 2—2 in Fig. 1.

Fig. 3 a section on the line 3—3 in Fig. 1.

Fig. 4 a side elevation of the tripod.

Fig. 5 a section on the line 5—5 in Fig. 4.

Fig. 6 an elevation of a pipe supporting member.

Fig. 7 a bottom view of the brace locking the legs in open position.

Fig. 8 a side elevation of a part of the tripod showing the brace partly collapsed.

Fig. 9 a front view of a part of the tripod showing the brace partially collapsed.

Figures 10A, 11:
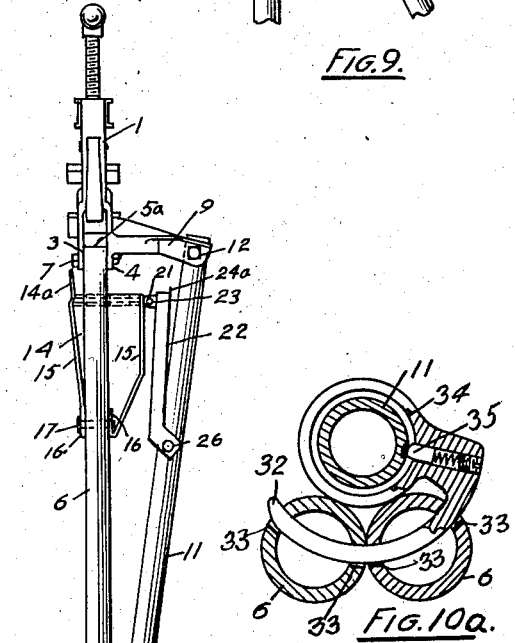
Fig. 10a shows a section on the line 10a—10a in Fig. 10.

Fig. 11 a side elevation of the tripod in folded position.

1 marks a pipe vise for which the tripod is particularly adapted, 2 the base of the pipe vise which forms the head of the tripod. The base has the extended ears 3 and 4 at its lower front corners forming sockets or spaces 5 for receiving the legs 6. Bolts 7 extend through the ears and the legs forming pivotal connections between the legs and the base. It will be noted that the space 5 terminates in a shoulder 5a which is engaged by the upper end of the leg when it is in full open position, thus definitely locating the leg with relation to the base. The lower ends of the legs have forwardly and outwardly extending curves 8 to increase the spread of the legs and provide greater stability. The legs 6 however extend directly downwardly from the vise for a sufficient distance to permit free clearance of any tools operating on material in the vise.

The base has a rearward extension 9 which is provided with a slot 10. A rear leg 11 extends into the slot and is pivotally mounted by means of a bolt 12 which extends through the sides of the slot and the leg. The rear of the slot forms a shoulder 10a limiting the movement of the leg 11 to its open position.

Figure 8:
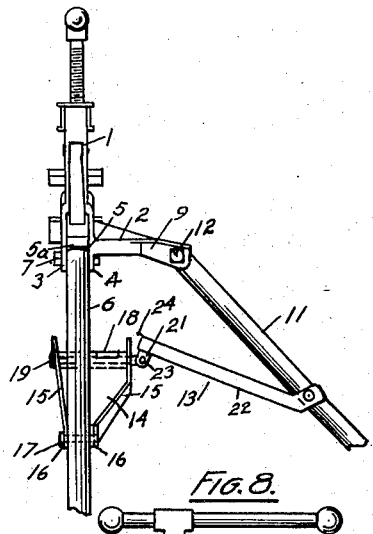
Figure 9:
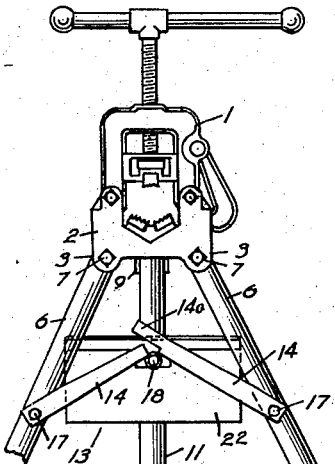
Figure 10:
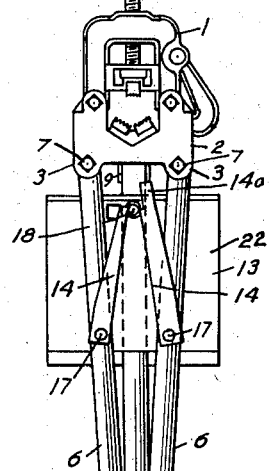
Fig. 10 shows a front elevation of the tripod in folded position.

A collapsible brace 13 is provided for locking the legs in open position. This brace is formed of three articulated members 14 and 22. These members are formed of plates flanged at their edges, the plates forming, when they are in open position, a tool receiving tray below the vise. The flanges 15 of the members 14 are extended, forming ears 16 which receive the legs 6. Bolts 17 extend through the ears 16 and the legs 6 thus forming a pivotal connection between the members 14 and the legs. The members 14 have complementary hinged butts 18 formed on the inner edges, and a hinge pin 19 extends through these butts. The pin has a flattened end 20 which is arranged between the ears 21 secured to the bottom of the member 22. A bolt 23 extends through the ears 21 and the end 20 of the pin 19 forming a pivotal connection between the member 22 and the pin 19. The member 22 has side flanges 24 which are extended beyond the plate 22 forming ears 25. These ears engage the sides of the rear leg 11 and are pivotally secured to the leg by bolt 26 which extends through the ears and the leg. The articulated brace permits the lifting of the brace, the members 14 swinging upwardly on the hinge formed by the butts 18 and pin 19 and the bolts 17. The members 14 and the member 22 are hinged through the pivot on the bolt 23 between the ears 21 and the pin 19. This articulated arrangement permits the upward collapsing of the brace as a whole and the inward swinging of the legs so that they may be brought together as shown in Figs. 10 and 11. In order to lock the brace in its lower position the flanges of one member 14 are extended at 14a so as to pass over the companion member and limit the downward movement of the members 14. The flanges 24 of the member 22 have the small projections 24a which extend over the flanges 15. The abutting of the flange 24 on the flange 15 with the projection 24a also locks or limits the downward movement of the joint formed by the bolt 23.

The stops 5a and 10a are located with relation to the legs so that they come into engagement slightly before the final downward movement of the brace is completed so that with the completion of the downward movement of the brace with its consequent toggle action, the legs are slightly stressed giving very definite rigidity to the tripod as a whole. The brace is carried downwardly sufficiently, having reference to the joints, to carry the toggle centers slightly below alignment with the leg connections of the brace so that when the brace reaches its lower position it is yieldingly locked against release.

It is desirable to provide a pipe support to the rear of the vise and this is accomplished in the present structure by the folding arm 27, the upper end of which has a pipe supporting surface 30. The arm is channel shaped, the sides of the channel at the lower end extending below the channel forming ears 28 straddling the leg 11. Bolt 29 extends through the ears and leg 11 forming a pivotal connection between the leg and the arm. This bolt is tightened sufficiently to distort or force the hollow leg 11 out of round so that the wall of the leg forms a spring take-up, maintaining a frictional engagement between the arm and the leg so that it will stay folded when the tripod is collapsed or will stay in its upper or set position with the tripod in open position for use.

A pipe 31 is shown in place in the vise resting on the supporting arm 27 in Fig. 4. It will be noted that the front of the tripod is clear to permit the swinging of cutter or threading tools on that part of the pipe extending in front of the vise.

In order to hold the legs assembled when the tripod is collapsed, I provide an arm 32 which extends through openings 33 in the legs 6. The arm extends from a sleeve 34 and is held in place when in use by a spring actuated detent 35. The arm can be retracted and this permits the tripod to be opened.

It will be noted that the arm 32 extends in arcuate form centered on the swinging center of the swivel connection so that as it is swung in one direction it engages and holds both the legs other than the one on which the arm is swivelled. With the arm extending through the openings it makes a more secure fastening and provides an arm that has little extension from the leg and consequently slight obstruction when the tripod is open.

What I claim as new is:

1. In a tripod having a head and legs, an arm swivelled on one of the legs, said arm having a hook-like extension adapted to hook the remaining two legs by a movement of the arm from one direction.

2. A tripod having a head and legs, an arm swivelled around one of the legs and having a hook-like extension movable to hook both the other of the legs by swinging in one direction.

3. A tripod having a head and legs, two of the legs having openings therethrough, an arm swivelled on the other of said legs and having an arcuate extension adapted to be swung into the openings in said legs for holding said legs in closed position.

4. A tripod having a head and legs, an arm swivelled around one of the legs and having a hook-like extension movable to hook both the other of the legs by swinging in one direction, and means yieldingly holding the arm in set position.

THORVALD PETERSEN.